United States Patent
Zhu

(10) Patent No.: US 10,791,307 B2
(45) Date of Patent: Sep. 29, 2020

(54) IMAGE DETAILS PROCESSING METHOD, APPARATUS, TERMINAL, AND STORAGE MEDIUM

(71) Applicant: NUBIA TECHNOLOGY CO., LTD., Shenzhen (CN)

(72) Inventor: Dezhi Zhu, Shenzhen (CN)

(73) Assignee: NUBIA TECHNOLOGY CO., LTD., Shenzhen (CN)

(*) Notice: Subject to any disclaimer, the term of this patent is extended or adjusted under 35 U.S.C. 154(b) by 51 days.

(21) Appl. No.: 16/064,566

(22) PCT Filed: Sep. 7, 2016

(86) PCT No.: PCT/CN2016/100335
§ 371 (c)(1),
(2) Date: Jun. 21, 2018

(87) PCT Pub. No.: WO2017/107605
PCT Pub. Date: Jun. 29, 2017

(65) Prior Publication Data
US 2019/0007666 A1 Jan. 3, 2019

(30) Foreign Application Priority Data
Dec. 23, 2015 (CN) .......................... 2015 1 0979522

(51) Int. Cl.
*G06T 5/00* (2006.01)
*H04N 9/64* (2006.01)
(Continued)

(52) U.S. Cl.
CPC ............ *H04N 9/646* (2013.01); *G06T 5/007* (2013.01); *G06T 5/008* (2013.01); *H04N 1/4072* (2013.01);
(Continued)

(58) Field of Classification Search
None
See application file for complete search history.

(56) References Cited

U.S. PATENT DOCUMENTS 9,076,224 B1*  7/2015 Shah ...................... G06T 5/009
9,196,024 B2* 11/2015 Weng ...................... G06T 5/002
(Continued)

FOREIGN PATENT DOCUMENTS

| CN | 101035300 A | 9/2007 |
| CN | 103440623 A | 12/2013 |
| CN | 105635525 A | 6/2016 |

OTHER PUBLICATIONS

The World Intellectual Property Organization (WIPO) International Search Report for PCT/CN2016/100335 dated Dec. 15, 2016 5 Pages.

*Primary Examiner* — Twyler L Haskins
*Assistant Examiner* — Wesley J Chiu
(74) *Attorney, Agent, or Firm* — Anova Law Group, PLLC

(57) ABSTRACT

Embodiments of the present disclosure disclose an image details processing method, comprises: obtaining each luminance data in the image; performing non-linear transformation on the each luminance data to obtain corresponding transformed data; performing the low frequency processing on the transformed data to obtain low frequency data; based on the low-frequency data and the transformed data, determining the corrected luminance data. The embodiments of the present disclosure also disclose an image details processing apparatus, a terminal, and a storage medium.

12 Claims, 6 Drawing Sheets

Obtaining each luminance data in the image — 201

Performing non-linear transformation on the each luminance data to obtain corresponding transformed data — 202

Performing the low frequency processing on the transformed data to obtain low frequency data — 203

Based on the low-frequency data and the transformed data, determining the corrected luminance data — 204

(51) Int. Cl.
*H04N 5/21* (2006.01)
*H04N 1/407* (2006.01)
*H04N 5/205* (2006.01)
*H04N 9/77* (2006.01)

(52) U.S. Cl.
CPC ............. *H04N 5/205* (2013.01); *H04N 5/21* (2013.01); *H04N 9/77* (2013.01)

(56) References Cited

U.S. PATENT DOCUMENTS

| | | | |
|---|---|---|---|
| 2008/0101719 A1* | 5/2008 | Lim | H04N 1/4072 382/274 |
| 2011/0181787 A1 | 7/2011 | Wang et al. | |
| 2013/0100265 A1* | 4/2013 | Suzuki | A61B 1/00045 348/74 |
| 2014/0184916 A1* | 7/2014 | Steiner | G06T 5/007 348/607 |
| 2014/0328539 A1* | 11/2014 | Weng | G06T 5/20 382/167 |
| 2015/0208046 A1* | 7/2015 | Kawaguchi | H04N 9/69 348/234 |
| 2017/0249721 A1* | 8/2017 | Hirai | G06T 5/20 |

* cited by examiner

IMAGE DETAILS PROCESSING METHOD, APPARATUS, TERMINAL, AND STORAGE MEDIUM

CROSS-REFERENCE TO RELATED APPLICATIONS

This application is a national phase entry under 35 U.S.C. § 371 of International Application No. PCT/CN2016/100335, filed on Sep. 27, 2016, which claims priority to and benefits of Chinese Patent Application Serial No. 201510979522.5, filed with the State Intellectual Property Office of P. R. China on Dec. 23, 2015, the entire content of all of which is incorporated herein by reference.

FIELD OF THE DISCLOSURE

The present disclosure relates to image processing technologies and, in particular, relates to an image details processing method, an apparatus, a terminal and a storage medium.

BACKGROUND

With cameras and terminals with photograph function becoming more and more popular in daily life, merely taking pictures can no longer satisfy the user's requirements, and the user would like his pictures to be as clear as possible.

In the process of photographing an image, there are problems such as strong light, reflection, and so on. For example, a user photographs using a terminal with photograph function, when the sun is particularly strong outdoors, the part of the sky is always white with no details; or when encounters the subject reflecting light, a large amount of bright light will appear in the image. Therefore, the user views the image captured in such a special situation, the scene cannot be clearly seen, and the photograph effect is poor.

BRIEF SUMMARY OF THE DISCLOSURE

Embodiments of the present disclosure provide an image details processing method, an apparatus, a terminal and a storage medium so as to solve the existing technical problems, which make the blurred part of the image clear so that the user can see the blurred part and improve the user experience.

The technical solution of the embodiments of the present disclosure is implemented as follows:

The first aspect, embodiments of the present disclosure provide an image details processing method, comprises:
obtaining each luminance data in the image;
performing non-linear transformation on the each luminance data to obtain corresponding transformed data;
performing the low frequency processing on the transformed data to obtain low frequency data;
based on the low-frequency data and the transformed data, determining the corrected luminance data.

In one embodiment of the present disclosure, wherein: performing non-linear transformation on the each luminance data to obtain corresponding transformed data, comprises:
transforming the luminance data from the real-number domain to the logarithmic domain to obtain the corresponding transformed data.

In one embodiment of the present disclosure, wherein: performing the low frequency processing on the transformed data to obtain low frequency data, comprises:

performing low-frequency filtering on the transformed data to obtain the low-frequency data;
or, performing bi-linear interpolation on the transformed data to obtain the low-frequency data.

In one embodiment of the present disclosure, wherein: based on the low-frequency data and the transformed data, determining the corrected luminance data, comprises:
according to the first luminance formula, a corrected transformed data is determined, the first luminance formula is: $Log_n y'=(k-1)Log_n d+Log_n y$;
where the $Log_n y'$ is the corrected transformed data, the $Log_n d$ is the low-frequency data; the $Log_n y$ is the transformed data, and the n is a real number not 0;
from the corrected transformed data, the largest corrected transformed data is determined;
according to the second luminance formula, the corrected transformed data is determined, the second luminance formula is:

$$Y = \frac{e^{Log_n y'}}{Log_n y'_{max}} \times 255;$$

where the Y is the corrected transformed data, and $Log_n y'_{max}$ is the largest corrected transformed data.

In one embodiment of the present disclosure, wherein: obtaining each luminance data in the image, comprises:
receiving user's photographing instruction;
getting the image data of the current frame;
and separating the luminance component from the image data as the luminance data.

The second aspect, embodiments of the present disclosure provide an image details processing apparatus, comprises:
obtaining unit, configured to obtain each luminance data in the image;
processing unit, configured to perform non-linear transformation on the each luminance data to obtain corresponding transformed data; furthermore configured to perform the low frequency processing on the transformed data to obtain low frequency data;
and determining unit, configured to determining the corrected luminance data based on the low-frequency data and the transformed data.

In one embodiment of the present disclosure, wherein the processing unit is configured to transform the luminance data from the real-number domain to the logarithmic domain to obtain the corresponding transformed data.

In one embodiment of the present disclosure, wherein the processing unit is configured to perform low-frequency filtering on the transformed data to obtain the low-frequency data;
or, to perform bi-linear interpolation on the transformed data to obtain the low-frequency data.

In one embodiment of the present disclosure, wherein the determining unit is configured to:
according to the first luminance formula, a corrected transformed data is determined, the first luminance formula is: $Log_n y'=(k-1)Log_n d+Log_n y$;
where the $Log_n y'$ is the corrected transformed data, the $Log_n d$ is the low-frequency data; the $Log_n y$ is the transformed data, and the n is a real number not 0;
from the corrected transformed data, the largest corrected transformed data is determined;
according to the second luminance formula, the corrected transformed data is determined, the second luminance formula is:

$$Y = \frac{e^{Log_n y'}}{Log_n y'_{max}} \times 255;$$

where the Y is the corrected transformed data, and $Log_n y'_{max}$ is the largest corrected transformed data.

In one embodiment of the present disclosure, wherein the obtaining unit is configured to:

get the image data of the current frame;

and to separate the luminance component from the image data as the luminance data.

The third aspect, embodiments of the present disclosure provide a computer storage medium, the computer storage medium storing computer-executable instructions configured to perform the image details processing method provided by the first aspect.

The fourth aspect, embodiments of the present disclosure provide a terminal, the terminal comprises: storage medium, configured to store computer-executable instructions;

and processor, configured to obtain each luminance data in the image;

to perform non-linear transformation on the each luminance data to obtain corresponding transformed data;

to perform the low frequency processing on the transformed data to obtain low frequency data;

and to determine the corrected luminance data based on the low-frequency data and the transformed data.

Embodiments of the present disclosure disclose an image details processing method, apparatus, a terminal, and a storage medium. Firstly obtaining each luminance data in the image; then performing non-linear transformation on the each luminance data to obtain corresponding transformed data; performing the low frequency processing on the transformed data to obtain low frequency data; based on the low-frequency data and the transformed data, determining the corrected luminance data. In this way, the transformed data reduces the numerical range of the luminance data, and therefore, the processing difficulty of the luminance data is reduced, at the same time, the luminance data is corrected based on the transformed data and the low-frequency-processed transformed data. The unclear part is clearly adjusted by using the luminance data to improve the photographing effect, improve the user's viewing effect, and improve the user experience.

DETAILED DESCRIPTION

The following clearly and completely describes the technical solutions with reference to the accompanying drawings in the embodiments of the present disclosure.

The mobile terminal according to embodiments of the present disclosure will now be described with reference to the accompanying drawings. In the following description, usage of suffixes such as 'module', 'part' or 'unit' used for referring to elements is given merely to facilitate explanation of the present disclosure, without having any significant meaning by itself. Accordingly, the 'module' and 'part' may be mixedly used.

Mobile terminals may be implemented in various forms. For example, the terminal described in the present disclosure may include mobile terminals such as mobile phones, smart phones, notebook computers, digital broadcast receivers, PDAs (Personal Digital Assistants), PMPs (Portable Multimedia Player), navigation apparatuss, and the like, and fixed terminals such as digital TVs, desk top computers and the like. Hereinafter, it is assumed that the terminal is a mobile terminal. However, it would be understood by a person in the art that the configuration according to the embodiments of the present disclosure can be also applicable to the fixed types of terminals, except for any elements especially configured for a mobile purpose.

Figure 1:
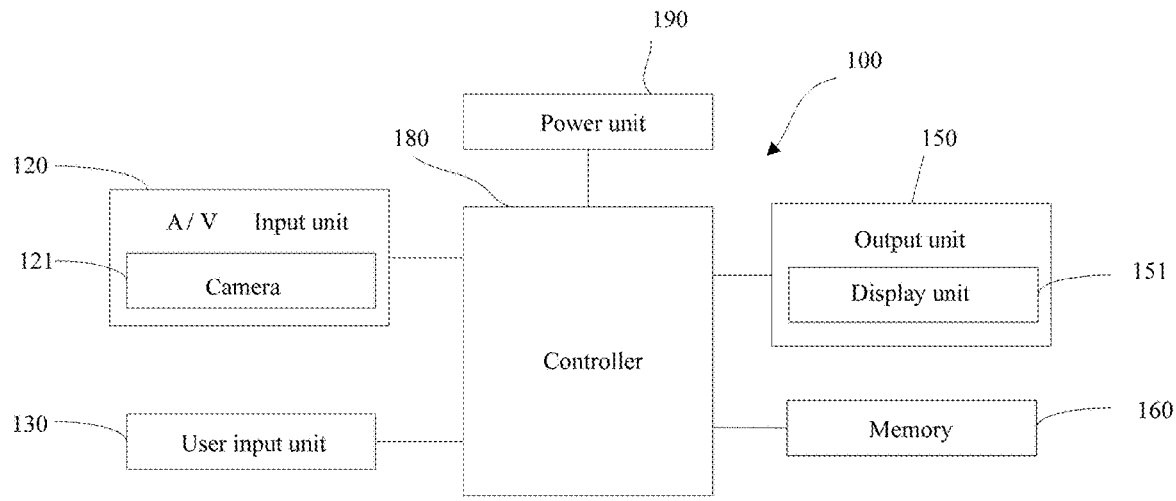
FIG. 1 is a block diagram of a mobile terminal in relation to an embodiment of the present disclosure.

FIG. 1 is a block diagram of a mobile terminal according to an embodiment of the present disclosure.

The mobile terminal 100 may include a wireless communication unit 110, an A/V (Audio/Video) input unit 120, an output unit 150, a memory 160, a controller 180, a power supply unit 190 and the like. FIG. 1 shows the mobile terminal as having various components, but it should be understood that implementing all of the illustrated components is not a requirement. Greater or fewer components may alternatively be implemented. The elements of the mobile terminal will be described in detail below.

The A/V input unit 120 is configured to receive an audio or video signal. The A/V input unit 120 may include a camera 121. The camera 121 processes image data of still pictures or video obtained by an image capture apparatus in a video capturing mode or an image capturing mode. The processed image frames may be displayed on a display unit 151. The image frames processed by the camera 121 may be stored in the memory 160 (or other storage medium) or transmitted via the wireless communication unit 110. Two or more cameras 121 may be provided according to the configuration of the mobile terminal.

The user input unit 130 may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input apparatus and an output apparatus. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit and an internal display unit. The touch screen may be configured to detect even a touch input pressure as well as a touch input position and a touch input area.

The memory 160 may store software programs or the like used for the processing and controlling operations performed by the controller 180, or may temporarily store data (e.g., a phonebook, messages, still images, video, etc.) that have been output or which are to be output. Also, the memory 160 may store data regarding various patterns of vibrations and audio signals output when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage apparatus that performs the storage function of the memory 160 over a network connection.

The controller 180 typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180. The controller 180 may perform a pattern recognition processing to recognize a handwriting input or a picture drawing input performed on the touch screen as characters or images.

The power supply unit 190 receives external power or internal power and supplies appropriate power required for operating respective elements and components under the control of the controller 180.

Various embodiments as described herein may be implemented in a computer-readable medium using, for example, computer software, hardware, or any combination thereof. For hardware implementation, the embodiments described herein may be implemented by using at least one of application specific integrated circuits (ASICs), digital signal processors (DSPs), digital signal processing apparatus (DSPDs), programmable logic apparatuss (PLDs), field programmable gate arrays (FPGAs), processors, controllers, micro-controllers, microprocessors, electronic units designed to perform the functions described herein. In some instances, such embodiments may be implemented in the controller 180. For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, a slide-type mobile terminal, among various types of mobile terminal such as folder-type, bar-type, swing-type, slide type mobile terminals, or the like, will be described as an example for the sake of brevity. Thus, the present disclosure can be applicable to any type of mobile terminal, without being limited to the slide-type mobile terminal.

The mobile terminal 100 as shown in FIG. 1 may be configured to operate with a communication system, which transmits data via frames or packets, such as wired and wireless communication systems, as well as satellite-based communication systems.

Based on the above mobile terminal hardware structure and communication system, various embodiments of the method of the present disclosure are proposed.

Embodiment 1

Figure 2:
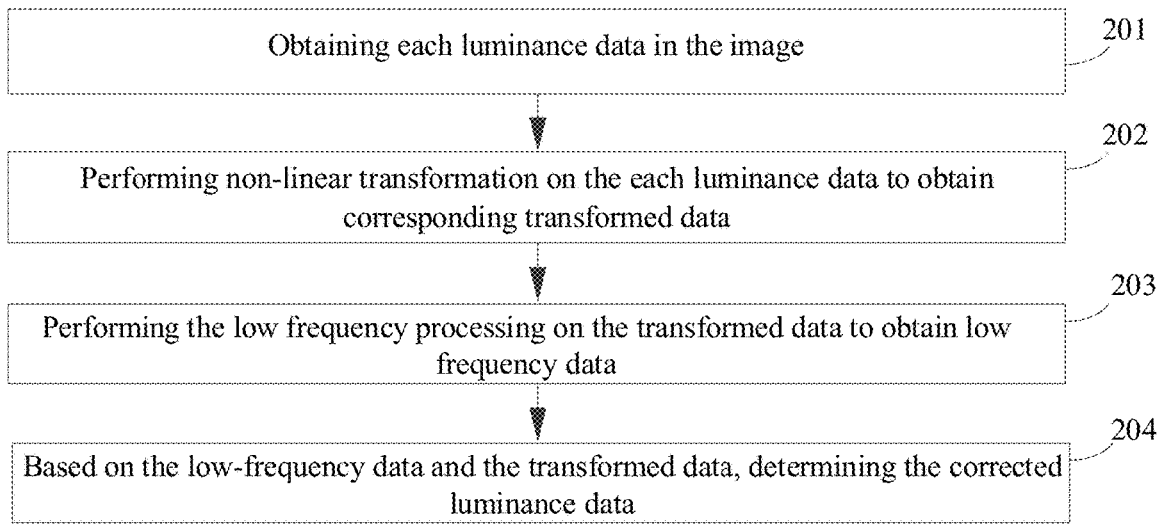
FIG. 2 is a flowchart of an image details processing method according to embodiments of the present disclosure.

Embodiments of the present disclosure provide an image details processing method. Referring to FIG. 2, the method is applied to an image details processing apparatus, the apparatus can be a camera, or part of the terminal with photographing function. The method comprises:

Step 201, obtaining each luminance data in the image.

In other embodiments of the present disclosure, receiving user's photographing instruction; getting the image data of the current frame; separating the luminance component from the image data as the luminance data. Wherein the image data includes a luminance component (Y component) and two color difference components (U component and V component). Here, the luminance data of this embodiment may be luminance data of a pixel.

YUV is a color coding method adopted by the European television system and is a color space adopted by Parr and Secan's analog color television system. In a modern color television system, a three-tube color camera or a charge-coupled apparatus (CCD) camera is usually used for image capturing, and then the obtained color image signal is subjected to color separation and amplification correction to obtain RGB. After the matrix transformation circuit obtains the luminance signal Y and two color-difference signals B-Y (i.e., U) and R-Y (i.e., V). Finally, the transmitting end encodes the three signals of luminance and color difference, respectively, and sends them out on the same channel. This color representation is the so-called YUV color space representation. The importance of using the YUV color space is that its luminance signal Y and color difference signals U, V are separated. In the embodiment, before the photographing, the user aligns the photographed object with the camera, and the image details processing apparatus acquires a real-time image signal. The image signal includes a brightness signal and two color difference signals. When the user presses the photographing key, the current frame is acquired. and extracting luminance components from the image data.

Step 202, performing non-linear transformation on the each luminance data to obtain corresponding transformed data.

In other embodiments of the present disclosure, the luminance data is converted from the real-number domain to the logarithmic domain in this embodiment to obtain the corresponding transformed data. That is to say, the function corresponding to the non-linear transformation uses log as the base, and the base can be data of e, 2, 10, etc. Here, the function is $Log_n y$ where y is the data brightness and n is the base number, which is not limited in this embodiment. The selection of the base value is still based on the value of the luminance data. Here, the function selected by the non-linear change can make the value of the larger luminance data is reduced and the smaller to larger; therefore, the function can also be an exponential function.

Step 203, performing the low frequency processing on the transformed data to obtain low frequency data.

In other embodiments of the present disclosure, the low-frequency processing method of this embodiment can be divided into at least two categories: one is a filtering method and the other is an interpolation method. The purpose of both is to obtain the low-frequency data that can use the low-frequency image of the user to perform low-frequency filtering on the transformed data.

Firstly, the low-frequency filtering in this embodiment may include bilateral filtering, Gaussian filtering, and other low-frequency filtering. Taking a Gaussian filter as an example, the transformed data is filtered by a Gaussian filter to obtain low frequency data. Here, Table 1 is the transformed data of the current frame. The transformed data in Table 1 can be input into the Gaussian formula to calculate the low frequency data. The Gaussian formula is:

$$P'_{i,j} = \frac{P_{i-1,j} + P_{i,j-1} + P_{i+1,j} + P_{i,j+1} + 2P_{i,j}}{6},$$

where i is a positive integer less than or equal to m, j is a positive integer less than or equal to o, m is a positive integer, and o is also a positive integer.

TABLE 1

| $P_{1,1}$ | $P_{1,2}$ | ... | $P_{1,o-1}$ | $P_{1,o}$ |
|---|---|---|---|---|
| $P_{2,1}$ | $P_{2,2}$ | ... | $P_{2,o-1}$ | $P_{2,o}$ |
| $P_{3,1}$ | $P_{3,2}$ | ... | $P_{3,o-1}$ | $P_{3,o}$ |
| . | . | ... | . | . |
| . | . | ... | . | . |
| . | . | ... | . | . |
| $P_{m-2,1}$ | $P_{m-2,2}$ | ... | $P_{m-2,o-1}$ | $P_{m-2,o}$ |
| $P_{m-1,1}$ | $P_{m-1,2}$ | ... | $P_{m-1,o-1}$ | $P_{m-1,o}$ |
| $P_{m,1}$ | $P_{m,2}$ | ... | $P_{m-1,o-1}$ | $P_{m-1,o}$ |

Secondly, because the purpose of this step in this embodiment is to obtain low-frequency data, that is, to obtain a blurred image corresponding to the transformed data, therefore, for convenience, the transformed data is bi-linearly interpolated to obtain low-frequency data. Here, Table 1 is the transformed data of the current frame, and the transformed data in Table 1 can be input into a bilinear interpolation formula to calculate the low frequency data. The bilinear interpolation formula is $$P'_{i,j} = \frac{P_{i-1,j} + P_{i,j-1} + P_{i+1,j} + P_{i,j+1}}{4},$$

where i is a positive integer less than or equal to m, j is a positive integer less than or equal to o, m is a positive integer, and o is also a positive integer.

Since the bilinear interpolation is already a prior art, this embodiment uses the 9-row 9-column transformed pixel in Table 2 as an example. First, the low frequency pixel of the center $P_{5,5}'$ is calculated according to the bilinear interpolation formula, every four rows and four columns are bilinearly interpolated, one pixel is obtained, and the entire image is traversed in a loop. We obtain an image that is processed by the bilinear interpolation formula four rows and four columns at a time, and other unprocessed pixels remain unchanged.

TABLE 2

| $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ |
|---|---|---|---|---|---|---|---|---|
| $P_{2,1}$ | $P_{2,2}$ | $P_{2,3}$ | $P_{2,4}$ | $P_{2,5}$ | $P_{2,6}$ | $P_{2,7}$ | $P_{2,8}$ | $P_{2,9}$ |
| $P_{3,1}$ | $P_{3,2}$ | $P_{3,3}$ | $P_{3,4}$ | $P_{3,5}$ | $P_{3,6}$ | $P_{3,7}$ | $P_{3,8}$ | $P_{3,9}$ |
| $P_{4,1}$ | $P_{4,2}$ | $P_{4,3}$ | $P_{4,4}$ | $P_{4,5}$ | $P_{4,6}$ | $P_{4,7}$ | $P_{4,8}$ | $P_{4,9}$ |
| $P_{5,1}$ | $P_{5,2}$ | $P_{5,3}$ | $P_{5,4}$ | $P^*_{5,5}$ | $P_{5,6}$ | $P_{5,7}$ | $P_{5,8}$ | $P_{5,9}$ |
| $P_{6,1}$ | $P_{6,2}$ | $P_{6,3}$ | $P_{6,4}$ | $P_{6,5}$ | $P_{6,6}$ | $P_{6,7}$ | $P_{6,8}$ | $P_{6,9}$ |
| $P_{7,1}$ | $P_{7,2}$ | $P_{7,3}$ | $P_{7,4}$ | $P_{7,5}$ | $P_{7,6}$ | $P_{7,7}$ | $P_{7,8}$ | $P_{7,9}$ |
| $P_{8,1}$ | $P_{8,2}$ | $P_{8,3}$ | $P_{8,4}$ | $P_{8,5}$ | $P_{8,6}$ | $P_{8,7}$ | $P_{8,8}$ | $P_{8,9}$ |
| $P_{9,1}$ | $P_{9,2}$ | $P_{9,3}$ | $P_{9,4}$ | $P_{9,5}$ | $P_{9,6}$ | $P_{9,7}$ | $P_{9,8}$ | $P_{9,9}$ |

As shown in Table 3, we get an image obtained by the above method. Italics represent the pixels of the transformation, and black represents the pixels without transformation. Next, we use the bolded pixel points in Table 3, and use bilinear interpolation to obtain the entire processed image. In practice, the row direction is processed first, and then the column direction is performed on the basis of the row processing result. Take the first row as an example, $$P'_{1,2} = \frac{3P'_{1,1} + P'_{1,5}}{4}; P'_{1,3} = \frac{P'_{1,1} + P'_{1,5}}{2}; P'_{1,4} = \frac{P'_{1,1} + 3P'_{1,5}}{4}.$$

After this process, we get the following processed image.

TABLE 4

| $P'_{1,1}$ | $P_{1,2}$ | $P_{1,3}$ | $P_{1,4}$ | $P'_{1,5}$ | $P_{1,6}$ | $P_{1,7}$ | $P_{1,8}$ | $P'_{1,9}$ |
|---|---|---|---|---|---|---|---|---|
| $P_{2,1}$ | $P_{2,2}$ | $P_{2,3}$ | $P_{2,4}$ | $P_{2,5}$ | $P_{2,6}$ | $P_{2,7}$ | $P_{2,8}$ | $P_{2,9}$ |
| $P_{3,1}$ | $P_{3,2}$ | $P_{3,3}$ | $P_{3,4}$ | $P_{3,5}$ | $P_{3,6}$ | $P_{3,7}$ | $P_{3,8}$ | $P_{3,9}$ |
| $P_{4,1}$ | $P_{4,2}$ | $P_{4,3}$ | $P_{4,4}$ | $P_{4,5}$ | $P_{4,6}$ | $P_{4,7}$ | $P_{4,8}$ | $P_{4,9}$ |
| $P'_{5,1}$ | $P_{5,2}$ | $P_{5,3}$ | $P_{5,4}$ | $P'_{5,5}$ | $P_{5,6}$ | $P_{5,7}$ | $P_{5,8}$ | $P'_{5,9}$ |
| $P_{6,1}$ | $P_{6,2}$ | $P_{6,3}$ | $P_{6,4}$ | $P_{6,5}$ | $P_{6,6}$ | $P_{6,7}$ | $P_{6,8}$ | $P_{6,9}$ |
| $P_{7,1}$ | $P_{7,2}$ | $P_{7,3}$ | $P_{7,4}$ | $P_{7,5}$ | $P_{7,6}$ | $P_{7,7}$ | $P_{7,8}$ | $P_{7,9}$ |
| $P_{8,1}$ | $P_{8,2}$ | $P_{8,3}$ | $P_{8,4}$ | $P_{8,5}$ | $P_{8,6}$ | $P_{8,7}$ | $P_{8,8}$ | $P_{8,9}$ |
| $P'_{9,1}$ | $P_{9,2}$ | $P_{9,3}$ | $P_{9,4}$ | $P'_{9,5}$ | $P_{9,6}$ | $P_{9,7}$ | $P_{9,8}$ | $P'_{9,9}$ |

Table 4 shows the results of bilinear interpolation in the row direction, followed by column interpolation.

In this way, according to the same method, take the second row as an example, $$P'_{2,2} = \frac{3P'_{2,1} + P'_{2,5}}{4}; P'_{2,3} = \frac{P'_{2,1} + P'_{2,5}}{2}; P'_{2,4} = \frac{P'_{2,1} + 3P'_{2,5}}{4};$$

$$P'_{2,6} = \frac{3P'_{2,5} + P'_{2,9}}{4}; P'_{2,7} = \frac{P'_{2,5} + P'_{2,9}}{2}; P'_{2,8} = \frac{P'_{2,5} + 3P'_{2,9}}{4}.$$

So as other rows.

After this step, all pixels of the image are processed to obtain transformed data.

Step 204, based on the low-frequency data and the transformed data, determining the corrected luminance data.

In other embodiments of the present disclosure, according to the first luminance formula, a corrected transformed data is determined, the first luminance formula is:

$$Log_n y' = (k-1)Log_n d + Log_n y;$$

where the $\text{Log}_n y'$ is the corrected transformed data, the $\text{Log}_n d$ is the low-frequency data; the $\text{Log}_n y$ is the transformed data, and the n is a real number not 0;

from the corrected transformed data, the largest corrected transformed data is determined;

according to the second luminance formula, the corrected transformed data is determined, the second luminance formula is:

$$Y = \frac{e^{Log_n y'}}{\text{Log}_n y'_{max}} \times 255;$$

where the Y is the corrected transformed data, and $\text{Log}_n y'_{max}$ is the largest corrected transformed data.

Figure 3A:
FIG. 3A is an unprocessed image.
Figure 3B:
FIG. 3B is an image processed by the filtering method of this embodiment.
Figure 3C:
FIG. 3C is an unprocessed image.
Figure 3D:
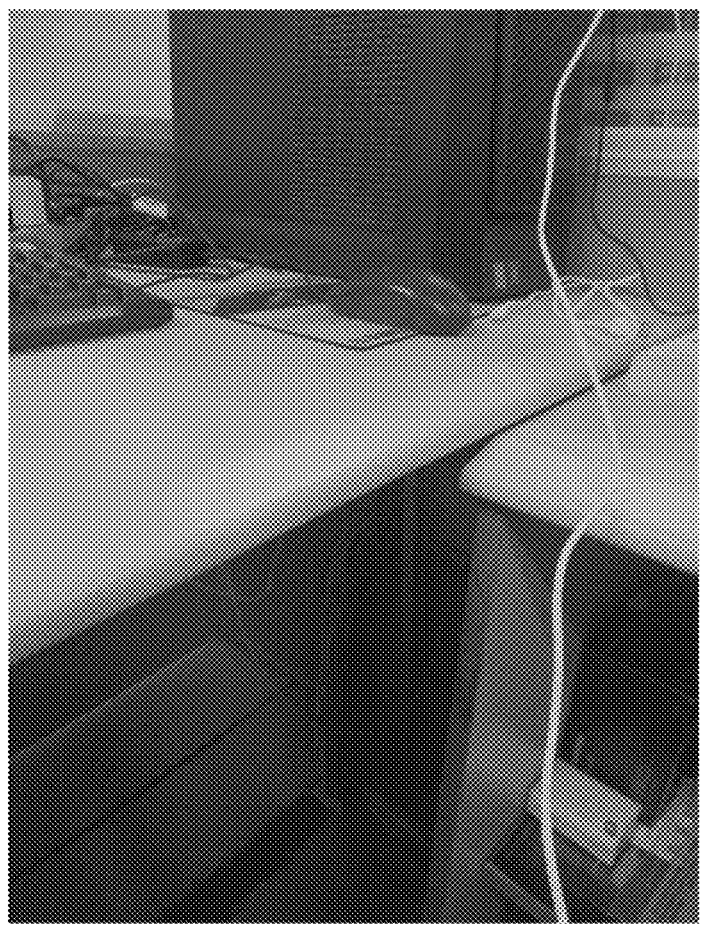
FIG. 3D is an image processed by the interpolation method of this embodiment.

FIG. 3A shows an unprocessed image, FIG. 3B shows an image processed by the filtering method of this embodiment; FIG. 3C shows an unprocessed image, and FIG. 3D shows an image processed by the interpolation method of this embodiment.

In this way, the transformed data reduces the numerical range of the luminance data, and therefore, the processing difficulty of the luminance data is reduced, at the same time, the luminance data is corrected based on the transformed data and the low-frequency-processed transformed data. The unclear part is clearly adjusted by using the luminance data to improve the photographing effect, improve the user's viewing effect, and improve the user experience.

Embodiment 3

Figure 4:
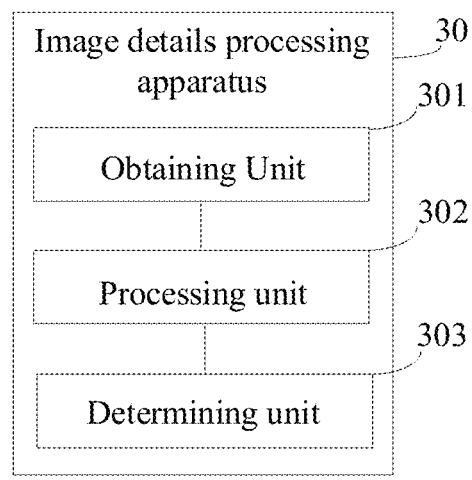
FIG. 4 is a schematic diagram of an image details processing apparatus according to embodiments of the present disclosure.

Embodiments of the present disclosure provide an image details processing apparatus 30. Referring to FIG. 4, the apparatus comprises:

obtaining unit 301, configured to obtain each luminance data in the image;

processing unit 302, configured to perform non-linear transformation on the each luminance data to obtain corresponding transformed data; furthermore configured to perform the low frequency processing on the transformed data to obtain low frequency data;

and determining unit 303, configured to determining the corrected luminance data based on the low-frequency data and the transformed data, In this way, the transformed data reduces the numerical range of the luminance data, and therefore, the processing difficulty of the luminance data is reduced, at the same time, the luminance data is corrected based on the transformed data and the low-frequency-processed transformed data. The unclear part is clearly adjusted by using the luminance data to improve the photographing effect, improve the user's viewing effect, and improve the user experience.

In one embodiment of the present disclosure, wherein the processing unit 302 is configured to transform the luminance data from the real-number domain to the logarithmic domain to obtain the corresponding transformed data.

In one embodiment of the present disclosure, wherein the processing unit 302 is configured to perform low-frequency filtering on the transformed data to obtain the low-frequency data;

or, to perform bi-linear interpolation on the transformed data to obtain the low-frequency data.

In one embodiment of the present disclosure, wherein the determining unit 303 is configured to:

according to the first luminance formula, a corrected transformed data is determined, the first luminance formula is: $\text{Log}_n y' = (k-1)\text{Log}_n d + \text{Log}_n y$;

where the $\text{Log}_n y'$ is the corrected transformed data, the $\text{Log}_n d$ is the low-frequency data; the $\text{Log}_n y$ is the transformed data, and the n is a real number not 0;

from the corrected transformed data, the largest corrected transformed data is determined;

according to the second luminance formula, the corrected transformed data is determined, the second luminance formula is:

$$Y = \frac{e^{Log_n y'}}{\text{Log}_n y'_{max}} \times 255;$$

where the Y is the corrected transformed data, and $\text{Log}_n y'_{max}$ is the largest corrected transformed data.

In one embodiment of the present disclosure, wherein the obtaining unit 305 is configured to:

receive user's photographing instruction;

to get the image data of the current frame;

and to separate the luminance component from the image data as the luminance data.

Embodiment 4

Figure 5:
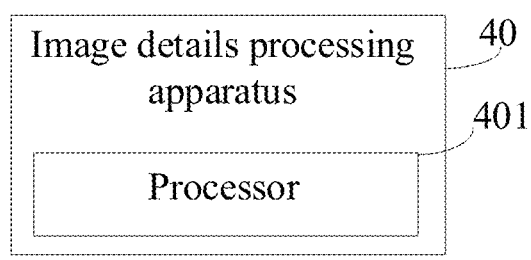
FIG. 5 is a schematic diagram of an image details processing apparatus according to embodiments of the present disclosure.

Embodiments of the present disclosure provide an image details processing apparatus 40. Referring to FIG. 5, the apparatus comprises:

Processor 401, configured to obtain each luminance data in the image, to perform non-linear transformation on the each luminance data to obtain corresponding transformed data; to perform the low frequency processing on the transformed data to obtain low frequency data; and to determine the corrected luminance data based on the low-frequency data and the transformed data.

In this way, the transformed data reduces the numerical range of the luminance data, and therefore, the processing difficulty of the luminance data is reduced, at the same time, the luminance data is corrected based on the transformed data and the low-frequency-processed transformed data. The unclear part is clearly adjusted by using the luminance data to improve the photographing effect, improve the user's viewing effect, and improve the user experience.

In one embodiment of the present disclosure, wherein the processor 401 is configured to transform the luminance data from the real-number domain to the logarithmic domain to obtain the corresponding transformed data.

In one embodiment of the present disclosure, wherein the processor 401 is configured to perform low-frequency filtering on the transformed data to obtain the low-frequency data;

or, to perform bi-linear interpolation on the transformed data to obtain the low-frequency data.

In one embodiment of the present disclosure, wherein the processor 401 is configured to:

according to the first luminance formula, a corrected transformed data is determined, the first luminance formula is: $\text{Log}_n y' = (k-1)\text{Log}_n d + \text{Log}_n y$;

where the $\text{Log}_n y'$ is the corrected transformed data, the $\text{Log}_n d$ is the low-frequency data; the $\text{Log}_n y$ is the transformed data, and the n is a real number not 0;

from the corrected transformed data, the largest corrected transformed data is determined;

according to the second luminance formula, the corrected transformed data is determined, the second luminance formula is:

$$Y = \frac{e^{Log_n y'}}{Log_n y'_{max}} \times 255;$$

where the Y is the corrected transformed data, and $Log_n y'_{max}$ is the largest corrected transformed data.

In one embodiment of the present disclosure, wherein the processor 401 is configured to:

receive user's photographing instruction;
to get the image data of the current frame;
and to separate the luminance component from the image data as the luminance data.

Each unit included in the image processing apparatus provided in this embodiment of the present disclosure, and each module included in each unit, and each submodule included in each module may be implemented by a processor in the terminal, and of course, may also by logic circuit; In the implementation process, the processor may be a central processing unit (CPU), a microprocessor (MPU), a digital signal processor (DSP), or a field programmable gate array (FPGA).

It should be noted that, when the above-mentioned integrated unit of the present disclosure is implemented in the form of a software functional module and is sold or used as an independent product, the integrated unit may also be stored in a computer-readable storage medium. Based on this understanding, the technical solutions in the embodiments of the present disclosure essentially, or the part contributing to the current technology, may be embodied in the form of a software product stored in a storage medium and including several instructions for a computer apparatus (which may be a personal computer, a server, a network apparatus, or the like) executing all or part of the methods described in the embodiments of the present disclosure. The foregoing storage medium includes various media capable of storing program codes, such as a removable storage apparatus, a ROM, a RAM, a magnetic disk, or an optical disk. In this way, embodiments of the present disclosure are not limited to any specific combination of hardware and software. Correspondingly, an embodiment of the present disclosure further provides a computer storage medium. The computer storage medium stores computer-executable instructions. The computer-executable instructions are used to execute the image details processing method in the embodiment of the present disclosure.

The skilled in the art should understand that the embodiments of the present disclosure may be provided as a method, a system, or a computer program product. Thus, the present disclosure may take the form of a hardware embodiment, a software embodiment, or an embodiment combining software and hardware aspects. Furthermore, the present disclosure may take the form of a computer program product embodied on one or more computer-usable storage media (including but not limited to disk storage, optical storage, etc.) having computer-usable program code embodied therein.

The present disclosure is described with reference to flowcharts and/or block diagrams of the method, the apparatus (system), and the computer program product according to the embodiment of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing apparatus to generate a machine for use in generating instructions for execution by a processor of a computer or other programmable data processing apparatus. A apparatus that implements the functions specified in one or more blocks of a flowchart or multiple flows and/or block diagrams of a flowchart.

The computer program instructions may also be stored in a computer readable memory capable of directing a computer or other programmable data processing apparatus to operate in a specific manner so that instructions stored in the computer readable memory produce an article of manufacture including the command apparatus. The apparatus implements the functions specified in one or more blocks of one or more processes and/or block diagrams of the flowchart.

These computer program instructions can also be loaded onto a computer or other programmable data processing apparatus such that a series of operational steps are performed on the computer or other programmable apparatus to generate computer-implemented processes for execution on a computer or other programmable apparatus. The instructions provide steps for implementing the functions specified in one or more blocks of a flowchart or a plurality of flowcharts and/or block diagrams of a flowchart.

The above description is only the preferred embodiments of the present invention and is not intended to limit the protection scope of the present invention.

INDUSTRIAL UTILITY

Embodiments of the present disclosure, firstly obtaining each luminance data in the image; then performing non-linear transformation on the each luminance data to obtain corresponding transformed data; performing the low frequency processing on the transformed data to obtain low frequency data; based on the low-frequency data and the transformed data, determining the corrected luminance data. In this way, the transformed data reduces the numerical range of the luminance data, and therefore, the processing difficulty of the luminance data is reduced, at the same time, the luminance data is corrected based on the transformed data and the low-frequency-processed transformed data. The unclear part is clearly adjusted by using the luminance data to improve the photographing effect, improve the user's viewing effect, and improve the user experience.

What is claimed is:

1. An image details processing method, comprises:
obtaining each luminance data in an image;
performing non-linear transformation on the each luminance data to obtain corresponding transformed data $Log_n y$, wherein y is luminance data, and n is a non-zero real number;
performing a low frequency processing on the transformed data to obtain low frequency data; and
based on the low-frequency data and the transformed data, determining a corrected luminance data Y by:
determining a corrected transformed data $Log_n y'$ according to the obtained low-frequency data and the transformed data $Log_n y$,
selecting a largest corrected transformed data $Log_n y'_{max}$ from the corrected transformed data $Log_n y'$, and determining the corrected luminance data Y by $$Y = \frac{e^{Log_n y'}}{Log_n y'_{max}} \times 255,$$

wherein $Log_n y'$ is the corrected transformed data and $Log_n y'_{max}$ is the largest corrected transformed data.

2. The method according to claim 1, wherein: performing non-linear transformation on the each luminance data to obtain corresponding transformed data, comprises:
  transforming the luminance data from a real-number domain to a logarithmic domain to obtain the corresponding transformed data.

3. The method according to claim 1, wherein: performing the low frequency processing on the transformed data to obtain low frequency data, comprises:
  performing low-frequency filtering on the transformed data to obtain the low-frequency data; or
  performing bi-linear interpolation on the transformed data to obtain the low-frequency data.

4. The method according to claim 1, wherein: obtaining each luminance data in the image, comprises:
  receiving user's photographing instruction;
  getting image data of a current frame; and
  separating a luminance component from the image data as the luminance data.

5. An image details processing apparatus, comprises:
  an obtaining unit, configured to obtain each luminance data in an image;
  a processing unit, configured to perform non-linear transformation on the each luminance data to obtain corresponding transformed data $Log_n y$, and perform a low frequency processing on the transformed data to obtain low frequency data, wherein y is luminance data, n is a non-zero real number; and
  a determining unit, configured to determine a corrected luminance data Y based on the low-frequency data and the transformed data by:
    determining a corrected transformed data $Log_n y'$ according to the obtained low-frequency data and the transformed data $Log_n y$,
    selecting a largest corrected transformed data $Log_n y'_{max}$ from the corrected transformed data $Log_n y'$, and
    determining the corrected luminance data Y by $$Y = \frac{e^{Log_n y'}}{Log_n y'_{max}} \times 255,$$

wherein $Log_n y'$ is the corrected transformed data and $Log_n y'_{max}$ is the largest corrected transformed data.

6. The apparatus according to claim 5, wherein the processing unit is configured to transform the luminance data from a real-number domain to a logarithmic domain to obtain the corresponding transformed data.

7. The apparatus according to claim 5, wherein the processing unit is configured to:
  perform low-frequency filtering on the transformed data to obtain the low-frequency data; or
  perform bi-linear interpolation on the transformed data to obtain the low-frequency data.

8. The apparatus according to claim 5, wherein the obtaining unit is configured to:
  receive user's photographing instruction;
  get image data of a current frame; and
  separate a luminance component from the image data as the luminance data.

9. A terminal, comprises:
  a storage medium, configured to store computer-executable instructions; and
  a processor, configured to:
    obtain each luminance data in an image,
    perform non-linear transformation on the each luminance data to obtain corresponding transformed data $Log_n y$, wherein y is the luminance data, n is a non-zero real number,
    perform a low frequency processing on the transformed data to obtain low frequency data, and
    determine a corrected luminance data Y based on the low-frequency data and the transformed data by:
      determining a corrected transformed data $Log_n y'$ according to the obtained low-frequency data and the transformed data $Log_n y$,
      selecting a largest corrected transformed data $Log_n y'_{max}$ from the corrected transformed data $Log_n y'$, and
      determining the corrected luminance data Y by $$Y = \frac{e^{Log_n y'}}{Log_n y'_{max}} \times 255,$$

wherein $Log_n y'$ is the corrected transformed data and $Log_n y'_{max}$ is the largest corrected transformed data.

10. The terminal according to claim 9, wherein: performing non-linear transformation on the each luminance data to obtain corresponding transformed data, comprises:
  transforming the luminance data from a real-number domain to a logarithmic domain to obtain the corresponding transformed data.

11. The terminal according to claim 9, wherein: performing the low frequency processing on the transformed data to obtain low frequency data, comprises:
  performing low-frequency filtering on the transformed data to obtain the low-frequency data;
  or, performing bi-linear interpolation on the transformed data to obtain the low-frequency data.

12. The terminal according to claim 9, wherein: obtaining each luminance data in the image, comprises:
  receiving user's photographing instruction;
  getting image data of a current frame; and
  separating a luminance component from the image data as the luminance data.

* * * * *